US 12,171,368 B1

(12) United States Patent
Wu et al.

(10) Patent No.: US 12,171,368 B1
(45) Date of Patent: Dec. 24, 2024

(54) COOKING APPLIANCE WITH REMOVABLE PLATES

(71) Applicants: Tsann Kuen (Zhangzhou) Enterprise Co., Ltd, Zhangzhou (CN); StoreBound LLC, New York, NY (US)

(72) Inventors: Chunyu Wu, Xiamen (CN); Weibin Ji, Zhangzhou (CN)

(73) Assignees: StoreBound, LLC, New York, NY (US); Tsann Kuen (Zhangzhou) Enterprise Co., Ltd, Zhangzhou (CN)

( * ) Notice: Subject to any disclaimer, the term of this patent is extended or adjusted under 35 U.S.C. 154(b) by 0 days.

(21) Appl. No.: 18/666,274

(22) Filed: May 16, 2024

(30) Foreign Application Priority Data

Jul. 11, 2023 (CN) .......................... 202321815813.7

(51) Int. Cl.
*A47J 37/06* (2006.01)
*A47J 27/00* (2006.01)
(52) U.S. Cl.
CPC ......... *A47J 37/0611* (2013.01); *A47J 27/002* (2013.01)
(58) Field of Classification Search
None
See application file for complete search history.

(56) References Cited

U.S. PATENT DOCUMENTS

| 1,947,124 A | | 7/1932 | Clauss | |
|---|---|---|---|---|
| 2,300,323 A | * | 10/1942 | Tams | ................... A47J 37/0611 192/84.1 |
| 2,795,182 A | * | 6/1957 | Gomersall | ........... A47J 37/0611 292/76 |
| 6,429,409 B1 | | 8/2002 | Siu | |
| 6,555,795 B2 | * | 4/2003 | Glucksman | .......... A47J 37/0611 219/524 |
| 8,692,164 B2 | | 4/2014 | Krishnan | |

(Continued)

FOREIGN PATENT DOCUMENTS

| EP | 0696430 | | 2/1996 | |
|---|---|---|---|---|
| EP | 2606788 A1 | * | 6/2013 | .......... A47J 37/0611 |

(Continued)

OTHER PUBLICATIONS

FR 3095333 A1 (Sartout, Pierre et al.) Oct. 30, 2020 [retrieved on Sep. 23, 2024]. Retrieved from Foreign Image and Text Database, translation by Clarivate Analytics. (Year: 2020).*
AliExpress Website "Waffles Maker Electric Waffle Machine Removable Plates 700W Breakfast Machine Bubble Egg Cake Oven 220V Waflera Mini Pot", Retrieved Feb. 2, 2024, pp. 1-7.
Wayfair Website "2-In-1 Waffle Maker With Removable Plates", Retrieved Feb. 2, 2024, pp. 1-8.

(Continued)

*Primary Examiner* — John J Norton
(74) *Attorney, Agent, or Firm* — Belles Katz LLC

(57) ABSTRACT

A cooking appliance includes a housing having a base portion defining a base cavity and an open top end of the base cavity, a top portion alterable relative to the base portion between an open state and a closed state, and a base locking mechanism coupled to the base portion of the housing. The cooking appliance further includes a first cooking plate removably coupled to the base portion of the housing to close the open top end of the base cavity. The cooking plate defines a first engagement feature and is configured to be locked to the housing via engagement between the base locking mechanism of the base portion and the first engagement feature. The base locking mechanism is alterable into an unlocked state to allow the first cooking plate to be detached from the housing.

22 Claims, 13 Drawing Sheets

(56) References Cited

U.S. PATENT DOCUMENTS

| | | | |
|---|---|---|---|
| 2004/0050256 A1* | 3/2004 | Patenotre | A47J 37/0611 99/372 |
| 2005/0247210 A1 | 11/2005 | Ragan | |
| 2007/0186785 A1* | 8/2007 | Cohen | A47J 37/0871 99/372 |
| 2008/0105137 A1 | 5/2008 | Genslak et al. | |
| 2008/0116193 A1* | 5/2008 | Lam | A47J 37/0611 219/393 |
| 2013/0248531 A1* | 9/2013 | Lane | A47J 47/14 220/849 |
| 2015/0312964 A1* | 10/2015 | Sorenson | H05B 1/0266 219/443.1 |
| 2017/0290101 A1* | 10/2017 | Hawkins | A47J 37/0611 |

FOREIGN PATENT DOCUMENTS

| | | | |
|---|---|---|---|
| EP | 2965672 A1 * | 1/2016 | A47J 37/0611 |
| FR | 3095333 A1 * | 10/2020 | A21B 5/023 |

OTHER PUBLICATIONS

Amazon Website "DASH Mini Waffle Maker with 7 Removable Plates-Spring Themed Plates—Bunny Clover Heart with Storage Container Non-Stick Coating—Temperature Control—Indicator Light for Home and Travel", Published Feb. 2, 2024, pp. 1-9.

Amazon Website "DASH Mini Maker for Individual Waffles, Hash Browns, Keto Chaffles with Easy to Clean, Non-Stick Surfaces, 4 Inch, Aqua", Published Oct. 31, 2016, pp. 1-17.

* cited by examiner

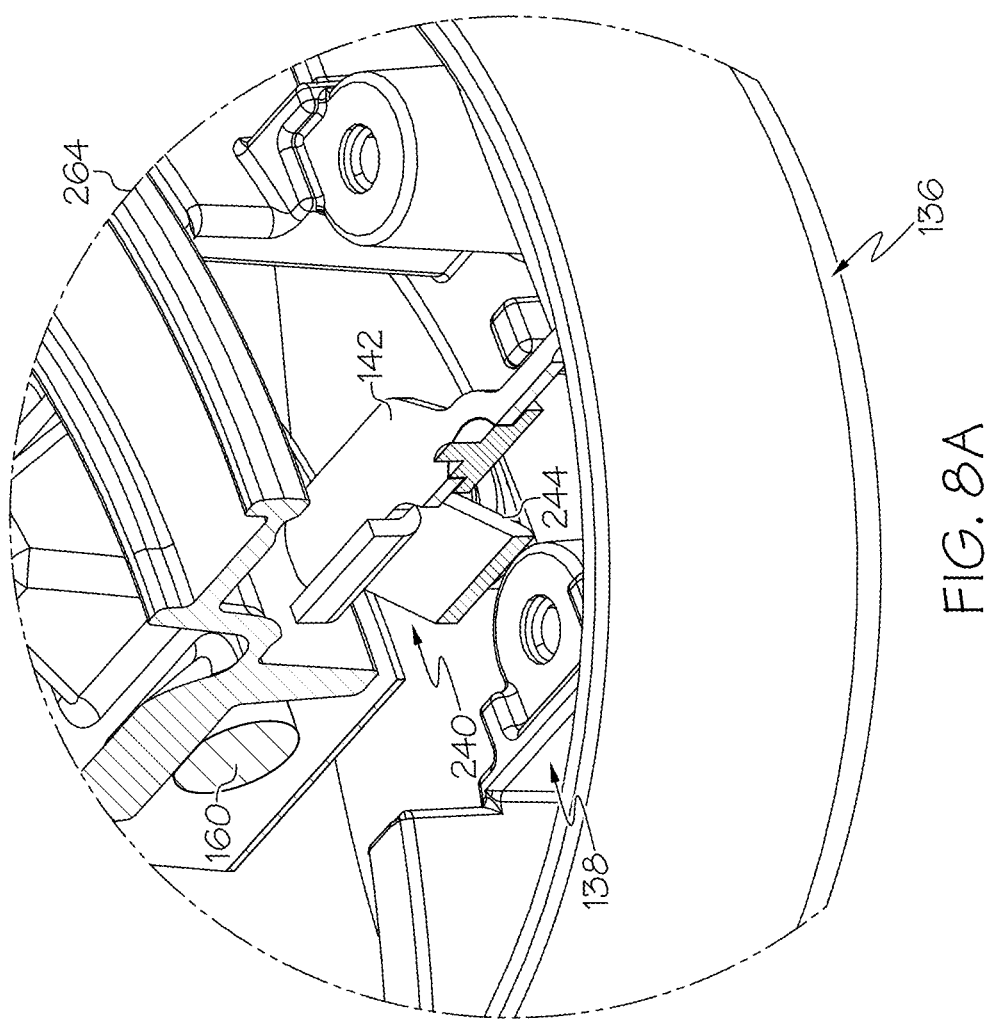

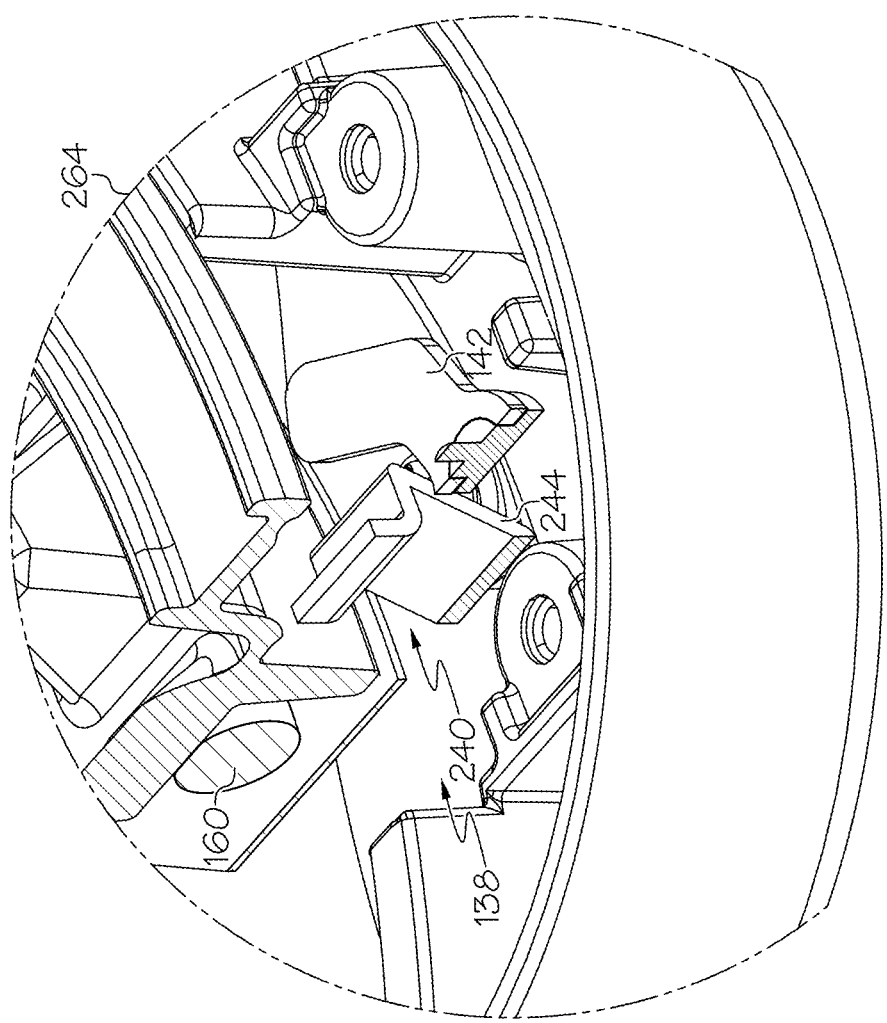

COOKING APPLIANCE WITH REMOVABLE PLATES

CROSS-REFERENCE TO RELATED APPLICATIONS

This application claims the benefit of Chinese Utility Model application No. 202321815813.7, filed on Jul. 11, 2023, the entirety of which is incorporated herein by reference.

FIELD OF THE DISCLOSURE

The present disclosure relates to cooking appliances, such as waffle irons, and more particularly to cooking appliances having removable cooking plates.

BACKGROUND

It is common for households to have several cooking appliances for various cooking needs. Cooking appliances may be designed to balance interests with respect to size, aesthetics, ease of use, ease of cleaning, material cost, structural integrity, and environmental impact.

Accordingly, those skilled in the art continue research and development in the field of cooking appliances.

BRIEF SUMMARY

A cooking appliance includes a housing including a base portion defining a base cavity and an open top end of the base cavity, a top portion alterable relative to the base portion between an open state and a closed state, and a base locking mechanism coupled to the base portion of the housing. The cooking appliance further includes a first heating element located within the base cavity of the base portion of the housing, a first cooking plate removably coupled to the base portion of the housing to close the open top end of the base cavity, the cooking plate defining a first engagement feature. The first cooking plate is configured to be locked to the housing via engagement between the base locking mechanism of the base portion and the first engagement feature. The base locking mechanism is alterable into an unlocked state to allow the first cooking plate to be detached from the housing.

In one example, the first engagement feature includes a post defined by the first cooking plate and an engagement bracket coupled to the post. In one example, the base locking mechanism includes a base button and a base latch mechanically engaged with the base button, the base latch being movable between a locked state and an unlocked state by actuation of the base button. In one example, the base latch is biased into the locked state. Inserting the first cooking plate into the base portion of the housing causes the base latch to alter from the locked state towards the unlocked state to fully seat the first cooking plate within the open top end of the base cavity, upon which the base latch automatically biases back to the locked state to lock the first cooking plate to the base portion of the housing. In one example, the first engagement feature of the first cooking plate includes a planar locking surface and an angled engagement surface. During insertion of the first cooking plate into the base portion of the housing, the angled engagement surface of the first engagement feature engages the base latch and moves the base latch from the locked state towards the unlocked state. Upon the base latch passing by the angled engagement surface, the base latch biases back into the locked state whereby the base latch engages the planar locking surface of the first engagement feature.

In one example, the first cooking plate includes a peripheral edge defining a planar portion having at least one engagement tab and an arcuate portion. The base portion of the housing defines at least one notch configured to receive the at least one engagement tab upon insertion of the first cooking plate into the base portion of the housing.

In one example, the top portion defines a top cavity and an open top end of the top cavity and the cooking appliance further includes a second heating element located within the top cavity of the top portion of the housing.

In one example, the cooking appliance includes a second cooking plate removably coupled to the top portion of the housing to close the open top end of the top cavity, the second cooking plate defining a second engagement feature. In one example, the second engagement feature includes a post defined by the second cooking plate and an engagement bracket coupled to the post.

In one example, the housing includes a top locking mechanism coupled to the top portion of the housing, the second cooking plate is configured to be locked to the housing via engagement between the top locking mechanism of the top portion and the second engagement feature. The top locking mechanism is alterable into an unlocked state to allow the second cooking plate to be detached from the housing.

In one example, the top locking mechanism includes a top button and a top latch mechanically engaged with the top button, the top latch being movable between a locked state and an unlocked state by actuation of the top button. In one example, the top latch is biased into the locked state. Inserting the second cooking plate into the top portion of the housing causes the top latch to alter from the locked state towards the unlocked state to fully seat the second cooking plate within the open top end of the top cavity, upon which the top latch automatically biases back to the locked state to lock the second cooking plate to the top portion of the housing. In one example, the second engagement feature of the second cooking plate includes a planar locking surface and an angled engagement surface. During insertion of the second cooking plate into the top portion of the housing, the angled engagement surface of the second engagement feature engages the top latch and moves the top latch from the locked state towards the unlocked state. Upon the top latch passing by the angled engagement surface, the top latch biases back into the locked state whereby the top latch engages the planar locking surface of the second engagement feature.

In one example, the second cooking plate includes a peripheral edge defining a planar portion having at least one engagement tab and an arcuate portion, and the top portion of the housing defines at least one notch configured to receive the at least one engagement tab upon insertion of the second cooking plate into the top portion of the housing.

In one example, the first cooking plate has a cooking surface, the second cooking plate has a cooking surface, and the cooking surface of the first cooking plate is different than the cooking surface of the second cooking plate.

In another example, a cooking appliance includes a housing including a base portion defining a base cavity and an open top end of the base cavity, a top portion defining alterable relative to the base portion between an open state and a closed state, the top portion defining a top cavity and an open top end of the top cavity, a base locking mechanism coupled to the base portion of the housing, a top locking mechanism coupled to the top portion of the housing, a first heating element located within the base cavity of the base portion of the housing, a second heating element located within the top cavity of the top portion of the housing, a first cooking plate removably coupled to the base portion of the housing to close the open top end of the base cavity, the first cooking plate defining a first engagement feature, a second cooking plate removably coupled to the top portion of the housing to close the open top end of the top cavity, the second cooking plate defining a second engagement feature. The first cooking plate is configured to be locked to the housing via engagement between the base locking mechanism of the base portion and the first engagement feature. The second cooking plate is configured to be locked to the housing via engagement between the top locking mechanism of the top portion and the second engagement feature. The base locking mechanism is alterable into an unlocked state to allow the first cooking plate to be detached from the housing, and the top locking mechanism is alterable into an unlocked state to allow the second cooking plate to be detached from the housing.

In one example, the first cooking plate includes a peripheral edge defining a planar portion having two engagement tabs and an arcuate portion, the base portion of the housing defines two notches configured to receive two engagement tabs upon insertion of the first cooking plate into the base portion of the housing, the second cooking plate includes a peripheral edge defining a planar portion having two engagement tabs and an arcuate portion, and the top portion of the housing defines two notches configured to receive the two engagement tabs upon insertion of the second cooking plate into the top portion of the housing.

In one example, the base portion defines an arcuate protrusion defining an opening and an internal cavity housing at least a portion of the base locking mechanism, and the top portion defines an arcuate protrusion defining an opening and an internal cavity housing at least a portion of the top locking mechanism.

In one example, the base locking mechanism includes a base button, a push rod operatively associated with the base button, a spring coupled to the push rod, a latch rotatably coupled to the push rod, and. a fixed sheet coupled to the base portion of the housing. In one example, the latch is rotatably coupled to the fixed sheet and the base button movably positioned in the housing. In one example, the spring is configured to provide an elastic force on the base button and the push rod to move between a first position at a first distance between a rotation point at which the base latch is rotatably connected to the fixed sheet and a first end of the base latch, the first distance being smaller than a second distance between the rotation point and a second end of the base latch, and wherein when the base button is moved from the initial position by an external force to drive the base latch to rotate through the push rod, the second end of the base latch moves from a connected position at which the second end of the base latch is buckled to a non-connected position at which the second end of the base latch is not buckled.

In one example, the latch and the fixed sheet are rotatably connected by a first rotation connecting member, and wherein the second end of the push rod and the first end of the base latch are rotatably connected by a second rotation connecting member.

In one example, fixed sheet is coupled to the housing by at least one screw. In one example, the spring is wrapped around the push rod, wherein a first end of the spring abuts the housing, and wherein a second end of the spring abuts the base button. In one example, when the base latch passes by the angled engagement surface, the base latch biases back into the locked state, whereby the base latch engages the planar locking surface of the first engagement feature, and wherein and the spring provides an elastic force for driving the second end of the base latch to move toward the planar locking surface to enable the second end of the base latch to move to the connected position, abutting a locking groove defined by the planar locking surface.

In one example, the cooking appliance further includes an oblique guiding mechanism for coupling the first cooking plate with the base portion, wherein when the when the first cooking plate is installed to the base portion, the angled engagement surface of the first engagement feature engages the base latch, and wherein the oblique guiding mechanism is configured to enable the first cooking plate to approach the base portion and to rotate synchronously so that the guiding slope rotates in a direction of pushing the second end of the base latch to rotate. In one example, the oblique guiding mechanism comprises a guiding post and an oblique guiding groove, wherein the guiding post is disposed on the first cooking plate, wherein the oblique guiding groove is formed on the base portion, and wherein when the first cooking plate is pressed against the base portion, the guiding post abuts the oblique guiding groove to make the first cooking plate rotate relative to the housing.

In one example, the base locking mechanism includes a base button that extends through the opening of the arcuate protrusion of the base portion and a base latch mechanically engaged with the base button, the base latch being movable between a locked state and an unlocked state by actuation of the base button, and the top locking mechanism includes a top button that extends through the opening of the arcuate protrusion of the top portion and a top latch mechanically engaged with the base button, the top latch being movable between a locked state and an unlocked state by actuation of the top button.

In one example, the first cooking plate includes a cooking surface and a non-cooking surface opposed from the cooking surface, the second cooking plate includes a cooking surface and a non-cooking surface opposed from the cooking surface, and the cooking surface of the first cooking plate is different than the cooking surface of the second cooking plate.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 8A is a top perspective cross-sectional view of a portion of the cooking appliance of FIG. 1;

FIG. 8B is a top perspective cross-sectional view of a portion of the cooking appliance of FIG. 1;

DETAILED DESCRIPTION

Figure 1:
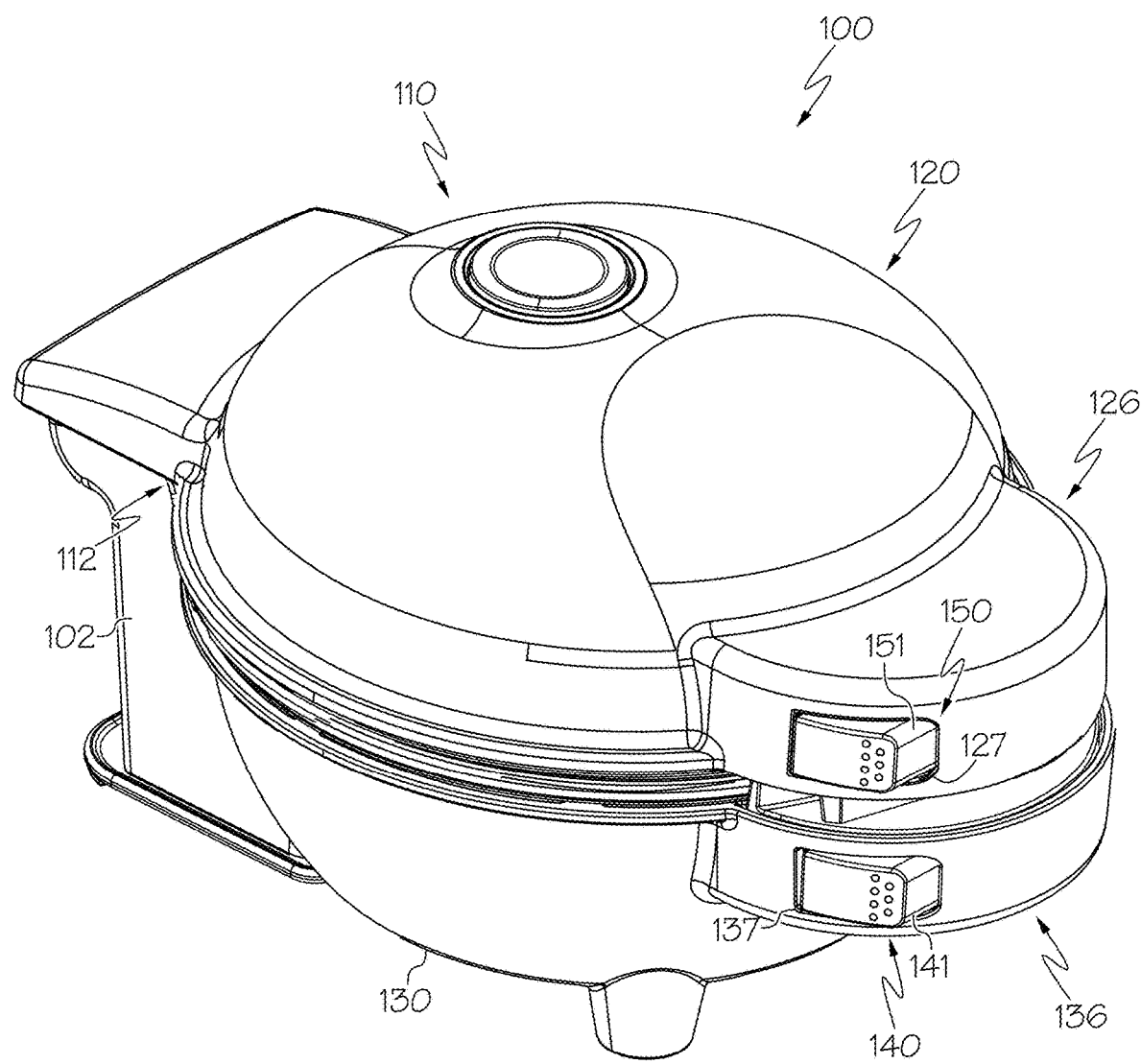
FIG. 1 is a front perspective view of a cooking appliance in a closed state in accordance with an embodiment of the present disclosure.

For illustrative purposes, the principles of the present disclosure are described by referencing various examples thereof. Although certain examples of the disclosure are specifically described herein, one of ordinary skill in the art will readily recognize that the same principles are equally applicable to, and can be employed in other applications and methods. It is to be understood that the disclosure is not limited in its application to the details of any particular example shown. The terminology used herein is for the purpose of description and not to limit the disclosure, its application, or uses.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", "containing", and "having" may be used interchangeably. The term "include" should be interpreted as "include, but are not limited to". The term "including" should be interpreted as "including, but are not limited to".

The following description of the preferred embodiment(s) is merely exemplary in nature and is in no way intended to limit the disclosure, its application, or uses. The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Referring to FIGS. 1 to 10b, disclosed is a cooking appliance 100. The cooking appliance 100 provides a solution for cooking foodstuff, such as waffles, pancakes, etc., having different patterns. The disclosed cooking appliance 100 includes interchangeable structures, such as cooking plates, for cooking foodstuff with different designs without the need for more than one cooking appliance 100.

The cooking appliance 100 includes a housing 110. The housing 110 includes a shell 102. The shell 102 houses a base portion 130 defining a base cavity 132 and an open top end 134 of the base cavity 132.

Figures 2, 3:
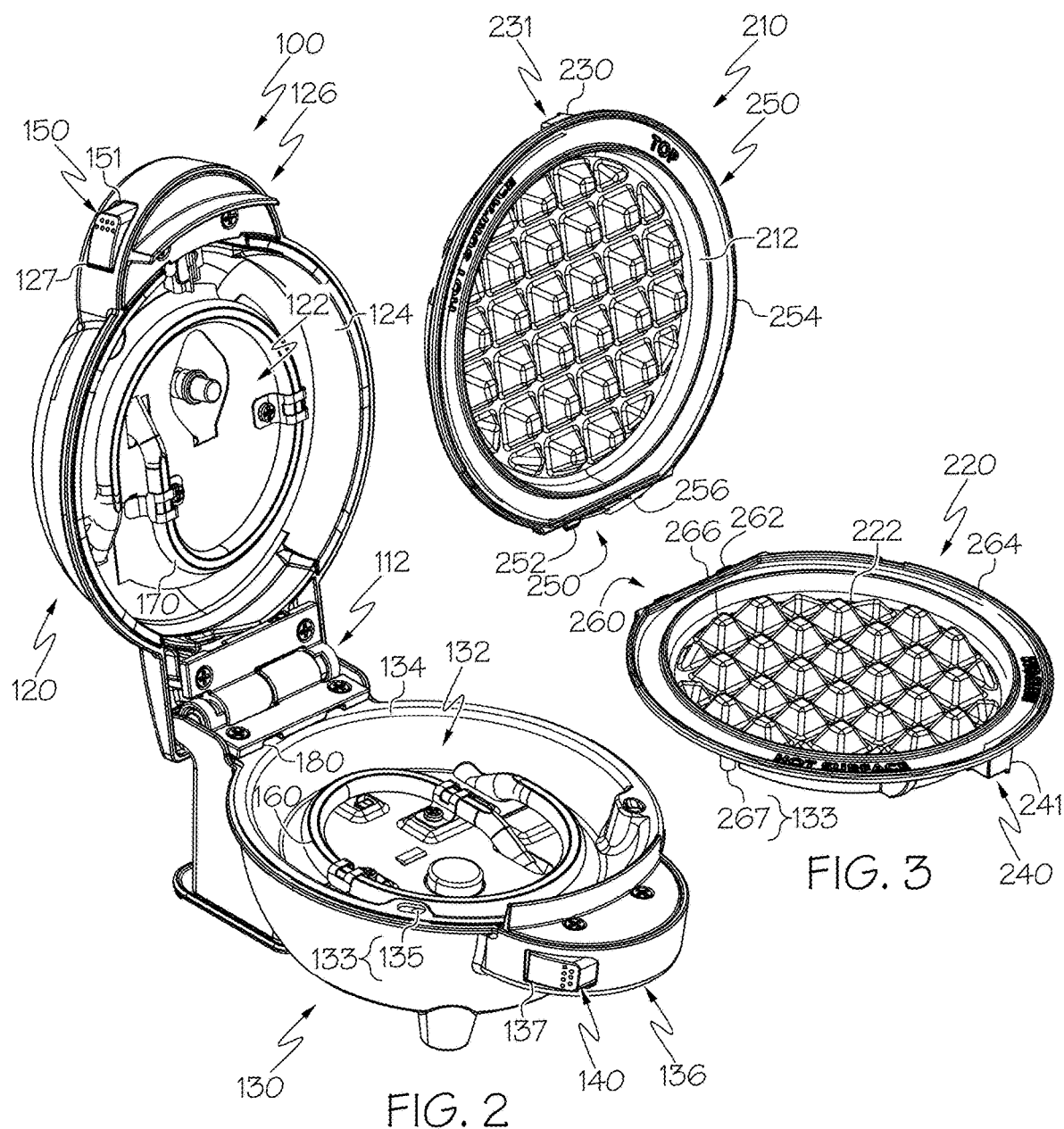
FIG. 2 is a front perspective view of a portion of the cooking appliance of FIG. 1 in an open state.
FIG. 3 is an exploded top perspective view of a portion of the cooking appliance of FIG. 1.

Referring to FIG. 2, the housing 110 further includes a top portion 120. The top portion 120 is alterable relative to the base portion 130 between an open state and a closed state. In one example, the top portion 120 is hingedly alterable relative to the base portion 130 between an open state and a closed state about a hinge portion 112 of the housing 110. The hinge portion 112 may be integrally connected with one of the base portion 130 and the top portion 120. In another example, the hinge portion 112 is removably coupled with the base portion 130 and the top portion 120.

Figure 6:
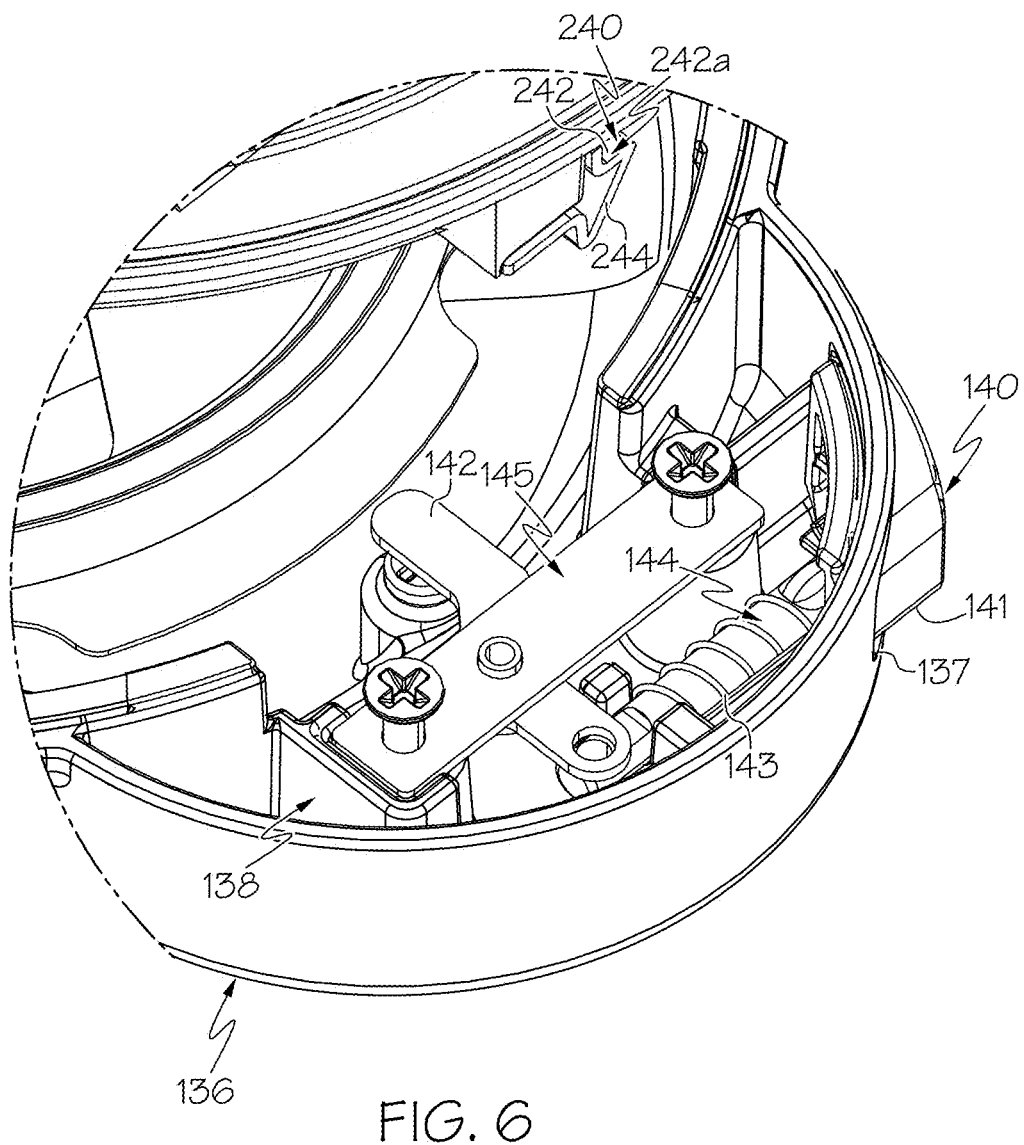
FIG. 6 is a perspective view of a portion of the cooking appliance of FIG. 1.

Referring to FIGS. 2 and 6, in one or more examples, the cooking appliance 100 includes a base locking mechanism 140 coupled to the base portion 130 of the housing 110. At least a portion of the base locking mechanism 140 is alterable between a locked state and an unlocked state to allow the first cooking plate 220 to be detached from the housing 110 as further described below.

Referring to FIG. 6, in one or more examples, the base locking mechanism 140 includes a base button 141 and a base latch 142 mechanically engaged with the base button 141. The base latch 142 is movable between a locked state and an unlocked state by actuation of the base button 141, see FIGS. 8a and 8b. In one example, the base latch 142 is rotatably connected to a fixed sheet 145, see FIG. 6. The fixed sheet 145 is fixedly connected to the housing 110 such that it is positioned within the internal cavity 138 of the base portion 130.

In one or more examples, the base locking mechanism 140 includes a spring 143, such as a torsion spring, to bias the base latch 142 into the locked state. The spring 143 may be operatively associated with a push rod 144. In one example, the spring 143 wraps around the push rod 144 such that it is sleeved outside the push rod 144. In one example, a first end of the spring 143 abuts the housing 110, and a second end of the spring 143 abuts the push rod 144 or the base button 141.

Figure 6A:
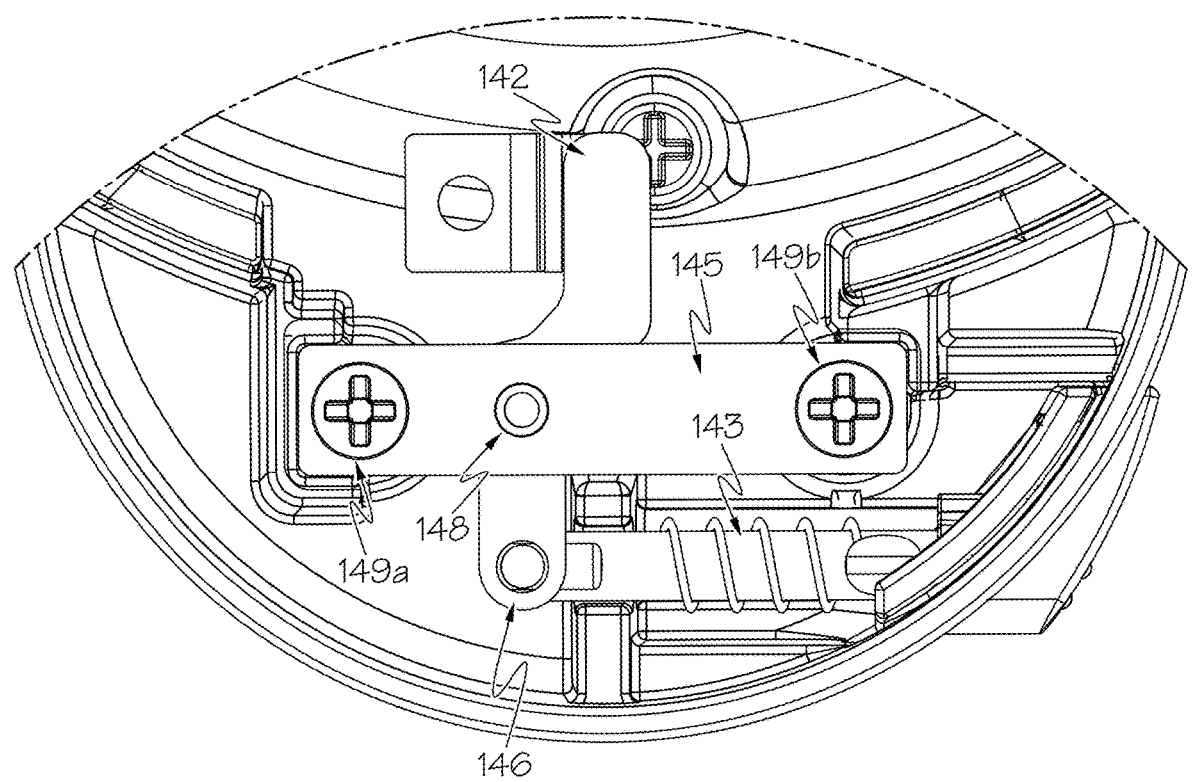
FIG. 6A is a top view of a portion of the cooking appliance of FIG. 1.

In one or more examples, the base button 141 is movably disposed on the housing 110 such that a first end of the push rod 144 is movably connected to and operatively associated with the base button 141. A second end of the push rod 144 is rotatably connected to a first end of the base latch 142. The spring 143 is configured to provide an elastic force upon compression of the base button 141 to in turn facilitate the push rod 144 to move to an initial position a first distance $L_1$ between a rotation point at which the base latch 142 is rotatably connected to the fixed sheet 145 and the first end of the base latch 142. The first distance $L_1$ is smaller than a second distance $L_2$ between the rotation point and a second end of the base latch 142, see FIG. 6A. Accordingly, the base button 141 is moved from the initial position by an external force to drive the base latch 142 to rotate through the push rod 144. The second end of the base latch 142 is configured to move from a connected position at which the second end of the base latch 142 is buckled to the pan to a non-connected position at which the second end of the base latch 142 is not buckled to the pan, and the push rod 144 spring accumulates elastic force.

In one example, the base latch 142 and the fixed sheet 145 are rotatably connected together through a first rotation connecting member 148. In another example, the second end of the push rod 144 and the first end of the latch 142 are rotatably connected together through a second rotation connecting member 146. In one example, the fixed sheet 145 is fixedly connected to the housing 110 with fasteners, such as screws 149*a*, 149*b*.

In one example, when the base latch 142 passes by the angled engagement surface 244, the base latch 142 biases back into the locked state whereby the base latch 142 engages the planar locking surface 242 of the first engagement feature 240. Further, the spring 143 provides an elastic force for driving the second end of the base latch 142 to move toward the planar locking surface 242 to enable the second end of the base latch 142 to move to the connected position, abutting a locking groove 242*a* defined by the planar locking surface 242.

Referring to FIG. 2 and FIG. 3, in one or more examples, the cooking appliance 100 further includes an oblique guiding mechanism 133. The oblique guiding mechanism 133 is a multi-piece component that is provided between the first cooking plate 220 and the base portion 130, having a guiding post 267 on the first cooking plate 220 and an oblique guiding groove 135 on the base portion 130. The guiding post is disposed 267 on a bottom surface of the first cooking plate 220, and the oblique guiding groove 135 is formed on a top surface of the base portion 130. When the first cooking plate 220 is pressed against the base portion 130, the guiding post 267 abuts the oblique guiding groove 135 to make the first cooking plate 220 and grill rotate relative to each other.

When the first cooking plate 220 is installed to the base portion 130 such that the guiding post 267 nests with the oblique guiding groove 135, the angled engagement surface 244 of the first engagement feature 240 engages the base latch 142. The oblique guiding mechanism 133 is configured to enable the cooking plate 220 to approach and removably connect with the base portion 130 and to rotate synchronously so that the guiding slope rotates in a direction so as to push the second end of the base latch 142 to rotate.

Referring to FIG. 2, in one or more examples, the cooking appliance 100 further includes a first heating element 160 located within the base cavity 132 of the base portion 130 of the housing 110. The first heating element 160 nests within the base cavity 132 such that it is positioned below the open top end 134 of the base portion 130. In one example, the first heating element 160 is die-cast and molded into the bottom cavity 132. Furthermore, there may be wiring, a power source, a processor/controller, or other electronic components located within the housing 110, such as between the shell 102 and the base cavity 132, to supply power to the first heating element 160. For example, wiring may be connected to a plug and to the first heating element 160 to activate the first heating element 160 when the plug is plugged into a wall socket or other electrical source.

In one or more examples, the cooking appliance 100 includes a first cooking plate 220 removably coupled to the base portion 130 of the housing 110. When coupled to the base portion 130 of the housing 110, the first cooking plate 220 covers the open top end 134 of the base cavity 132. The first cooking plate 220 may be formed from a material have requisite thermal conductivity for cooking foodstuff. For example, the first cooking plate 220 may be formed from a heat conductive metal material, such as copper, aluminum, iron, or the like, to allow the heat generated by the first heating element 160 to be transmitted conductively to the first cooking plate 220.

The first cooking plate 220 includes a cooking surface 222 and a non-cooking surface 224 opposed from the cooking surface 222. The cooking surface 222 may have a pattern or design for creating waffles, pancakes, or other foodstuff having the design of the cooking surface 222. For example, the cooking surface 222 may have a waffle pattern with a plurality of truncated pyramid shapes, or a design such as a heart or a flower, although other shapes and designs may be used as desired.

Figure 10A:
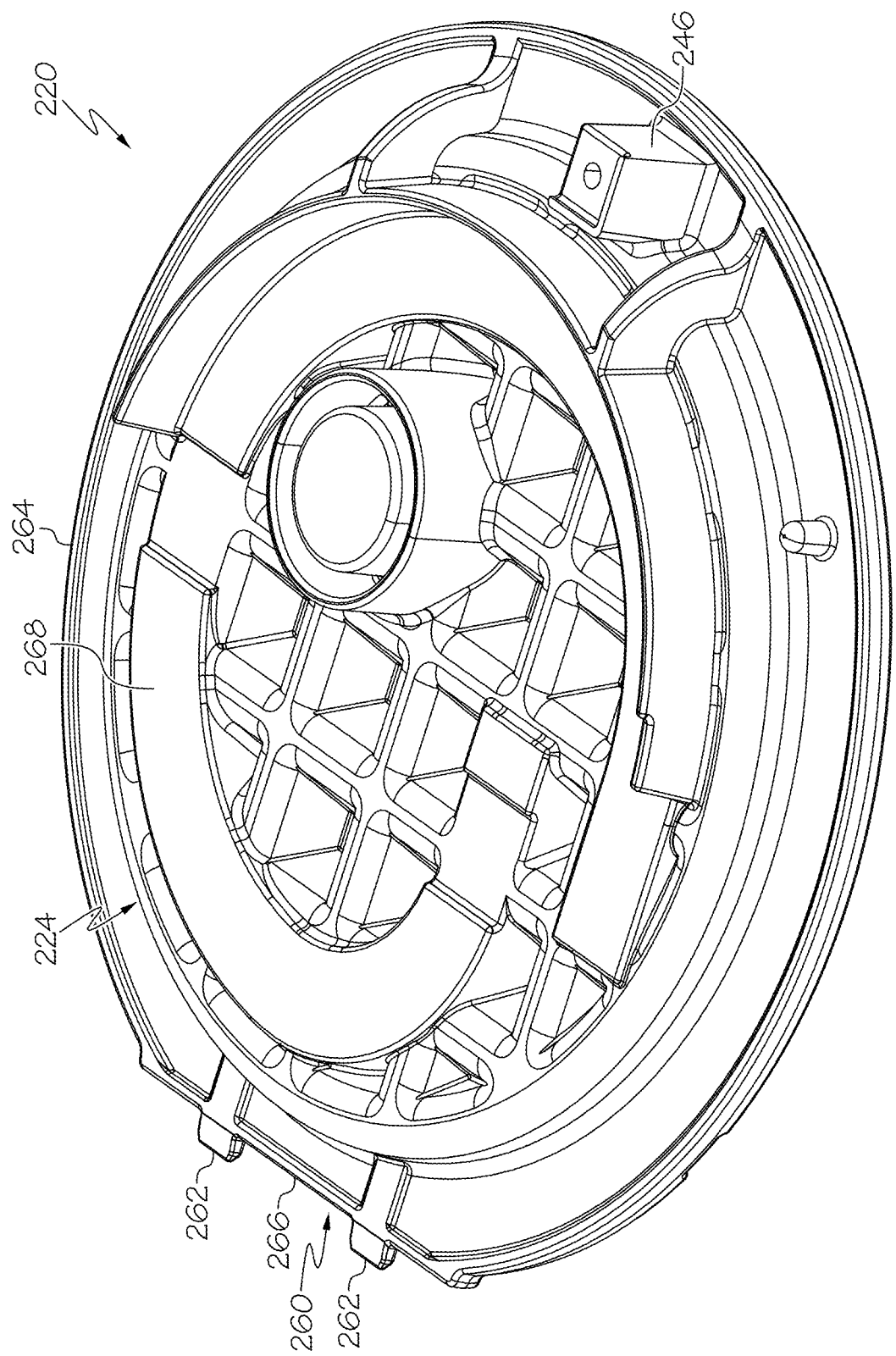
FIG. 10a is a bottom perspective view of a portion of the cooking appliance of FIG. 1.

The non-cooking surface 224, see FIG. 10*a*, may includes a recess 268 for nesting with a portion of the first heating element 160. The non-cooking surface 224 may be positioned in contact with the first heating element 160 for transferring heat from the first heating element 160 to the cooking surface 222 in contact with the foodstuff.

The first cooking plate 220 includes a first engagement feature 240. In one example, the first engagement feature 240 includes a post 246 defined by the first cooking plate 220 and an engagement bracket 241 coupled to the post 246. The engagement bracket 241 may be coupled to the post 246 with a fastener, such as a screw. In another example, the engagement feature 240 includes an engagement bracket 241 integrally formed with the first cooking plate 220 such that they are a single, monolithic structure. In yet another embodiment, the first engagement feature 240 may comprise a notch, cutout, or recess formed along a front portion of the peripheral edge 260 of the first cooking plate 220. The first engagement feature 240 may be an integral part of the first cooking plate 220 or may comprise a bracket that is coupled to the first cooking plate 220. Alternative configurations are also possible within the scope of the invention described herein.

Referring to FIGS. 8*a* and 8*b*, in one or more examples, the first cooking plate 220 is configured to be locked to the housing 110 via engagement between the base locking mechanism 140 of the base portion 130 and the first engagement feature 240. For example, the base latch 142 may be biased into the locked state. Inserting the first cooking plate 220 into the base portion 130 of the housing 110 may cause the base latch 142 to alter from the locked state towards the unlocked state to fully seat the first cooking plate 220 within the open top end 134 of the base cavity 132, upon which the base latch 142 automatically biases back to the locked state, locking the first cooking plate 220 to the base portion 130 of the housing 110.

Figure 4:
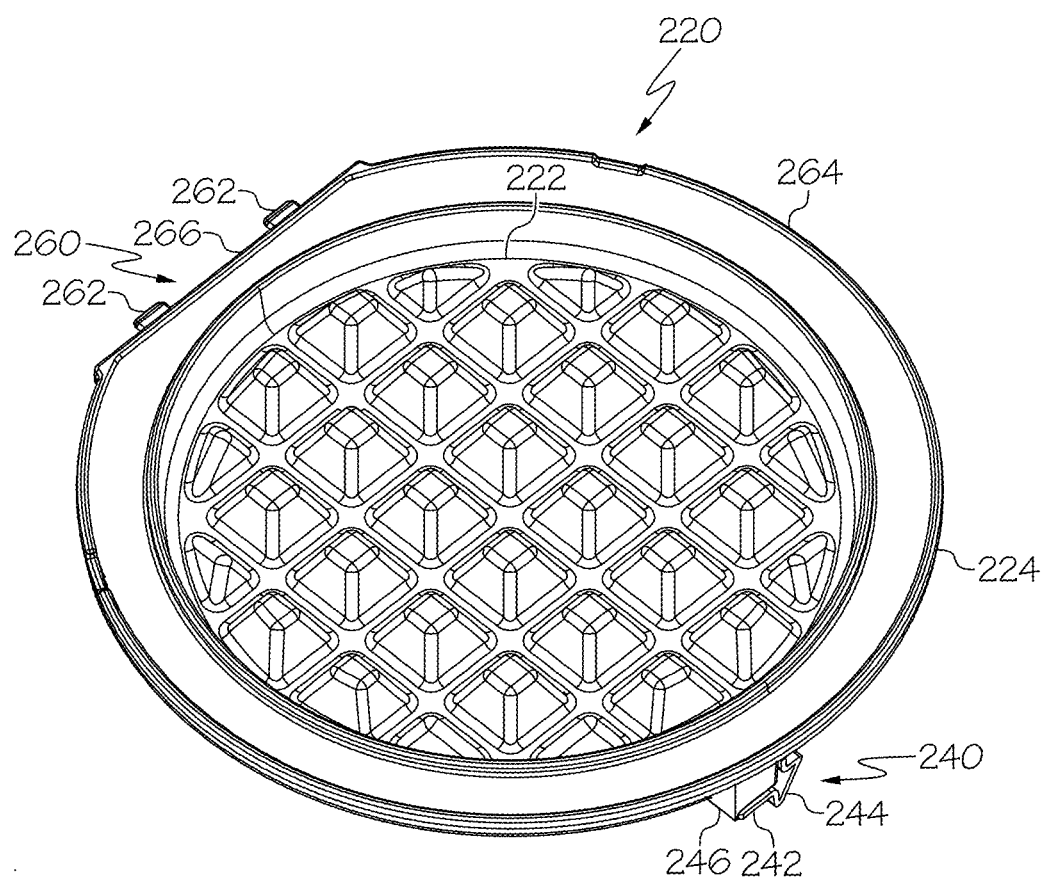
FIG. 4 is a perspective view of a portion of the cooking appliance of FIG. 1.
Figure 5:
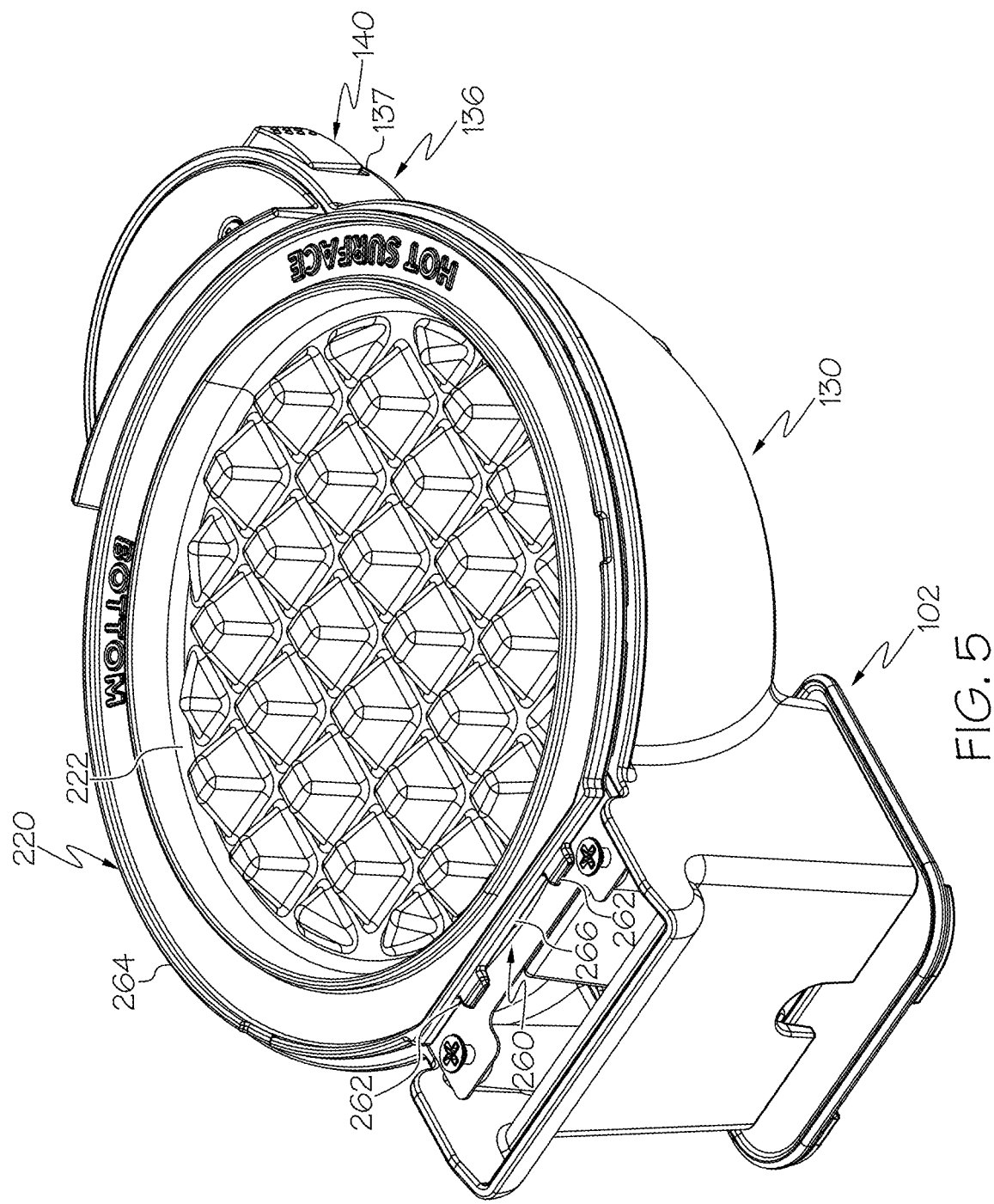
FIG. 5 is a perspective view of a portion of the cooking appliance of FIG. 1.

Referring to FIG. 4, in one or more examples, the first engagement feature 240 of the first cooking plate 220 includes a planar locking surface 242 and an angled engagement surface 244. During insertion of the first cooking plate 220 into the base portion 130 of the housing 110, the angled engagement surface 244 of the first engagement feature 240 engages the base latch 142 and moves the base latch 142 from the locked state towards the unlocked state. Further, upon the base latch 142 passing by the angled engagement surface 244, the base latch 142 biases back into the locked state whereby the base latch 142 engages the planar locking surface 242 of the first engagement feature 240.

Still referring to FIG. 4, in one or more examples, the first cooking plate 220 includes a peripheral edge 260 defining a planar portion 266 having at least one engagement tab 262 and an arcuate portion 264. In other embodiments, there may not be a planar portion 266, and instead the peripheral edge 260 may form a circle. In such an embodiment, the at least one engagement tab 262 (e.g., two engagement tabs 262 per the exemplified embodiment) may protrude from a rear arcuate portion of the peripheral edge 260. That is, the peripheral edge 260 of the first cooking plate 220 may comprise a rear portion, or a rear arcuate portion, and the two engagement tabs 262 may define a pair of engagement tabs that protrude from the rear portion of the peripheral edge 260 of the first cooking plate 220. The base portion 130 of the housing 110 defines at least one notch 180, see FIG. 2, configured to receive the at least one engagement tab 262 upon insertion of the first cooking plate 220 into the base portion 130 of the housing 110. In another example, the planar portion defines two engagement tabs 262 and the housing 110 defines two notches 180 configured to receive the two engagement tabs 262. The engagement tabs 262 may be integral with the first cooking plate 220 such that they form a single, monolithic structure.

Referring to FIG. 2, in one or more examples, the top portion 120 defines a top cavity 122 and an open top end 123 of the top cavity 122. The cooking appliance 100 further includes a second heating element 170 located within the top cavity 122 of the top portion 120 of the housing 110. The second heating element 170 nests within the top cavity 122 such that it is positioned below the open top end 124 of the top portion 120. In one example, the second heating element 170 is die-cast and molded into the top cavity 122. Furthermore, there may be wiring, a power source, a processor/controller, or other electronic components located within the housing 110, such as between the shell 102 and the top cavity 122, to supply power to the second heating element 170. For example, wiring may be connected to a plug and to the second heating element 170 to activate the second heating element 170 when the plug is plugged into a wall socket or other electrical source.

Referring to FIG. 3, in one or more examples, the cooking appliance 100 includes a second cooking plate 210 removably coupled to the top portion 120 of the housing 110. When positioned in the top portion 120 of the housing 110, the second cooking plate 210 closes the open top end 124 of the top cavity 122.

The second cooking plate 210 includes a cooking surface 212 and a non-cooking surface 214 opposed from the cooking surface 212. The cooking surface 212 may have a pattern or design for creating waffles, pancakes, or other foodstuff having the design of the cooking surface 212. For example, the cooking surface 212 may have a waffle pattern with a plurality of truncated pyramid shapes, or a design such as a heart or a flower, although other shapes and designs may be used as desired.

Figure 10B:
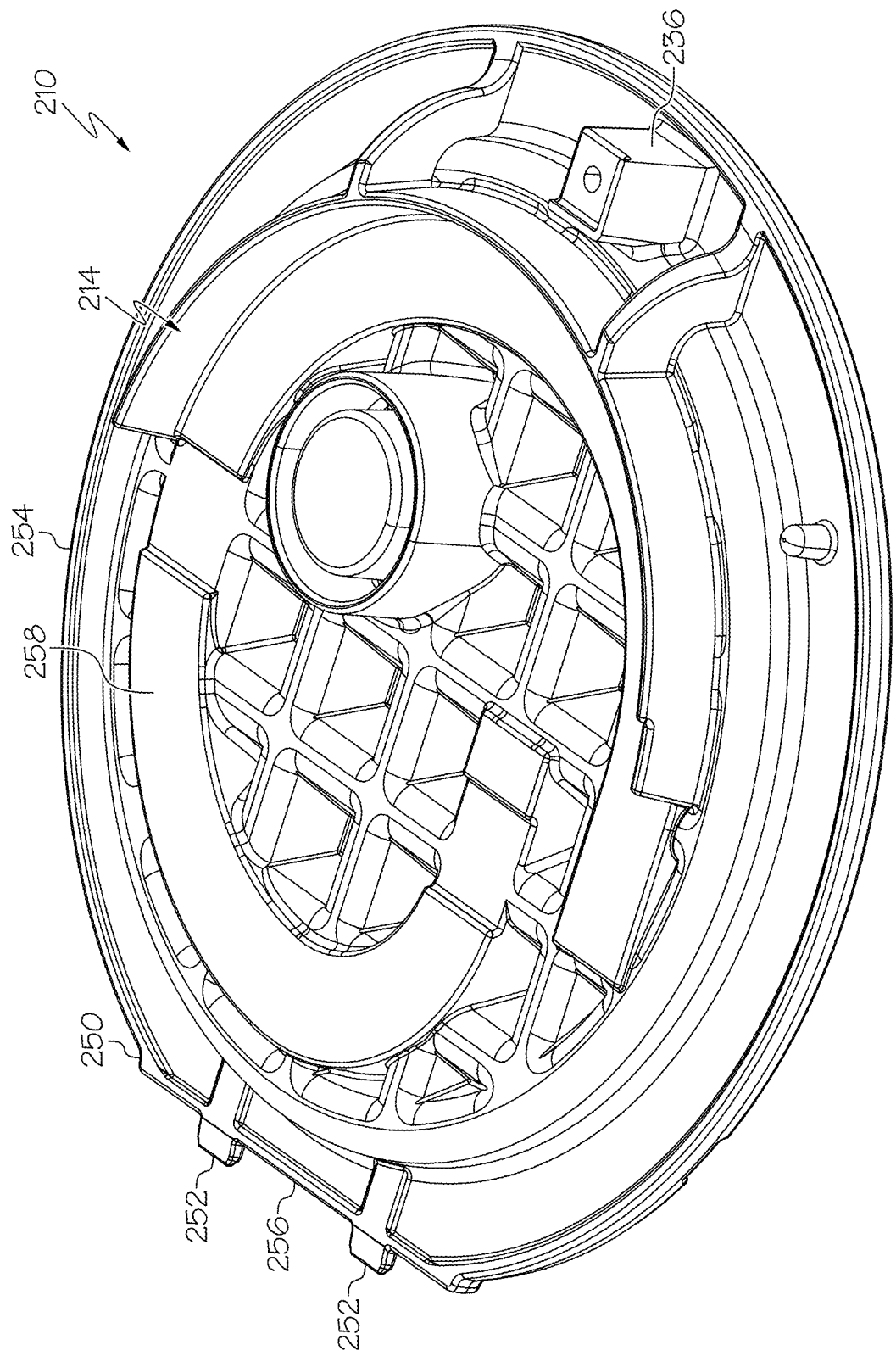
FIG. 10b is a bottom perspective view of a portion of the cooking appliance of FIG. 1.

The non-cooking surface 214, see FIG. 10b, may include a recess 258 for nesting with a portion of the second heating element 170. The non-cooking surface 214 may be positioned in contact with the second heating element 170 for transferring heat from the second heating element 170 to the cooking surface 212 in contact with the foodstuff.

Figure 9:
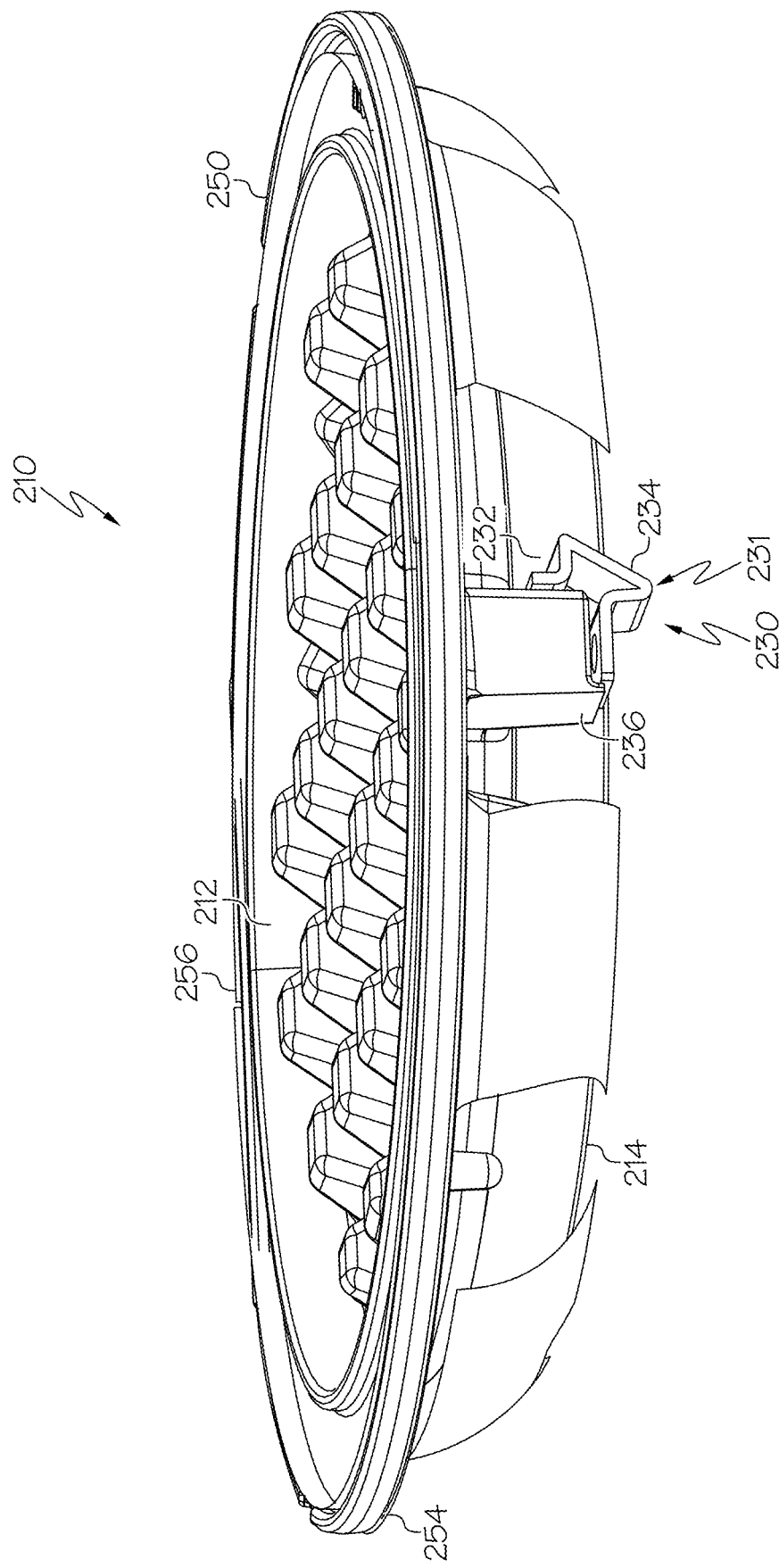
FIG. 9 is a front perspective view of a portion of the cooking appliance of FIG. 1.

Referring to FIG. 3 and FIG. 9, the second cooking plate 210 defining a second engagement feature 230. In one example, the second engagement feature 230 includes a post 236 defined by the second cooking plate 210 and an engagement bracket 231 coupled to the post 236. The engagement bracket 231 may be coupled to the post 236 with a fastener, such as a screw. In another example, the second engagement feature 230 includes an engagement bracket 231 that is integrally formed with the second cooking plate 210 such that they are a single, monolithic structure.

Referring to FIG. 2, in one or more examples, the housing 110 includes a top locking mechanism 150 coupled to the top portion 120 of the housing 110. The second cooking plate 210 is configured to be locked to the housing 110 via engagement between the top locking mechanism 150 of the top portion 120 and the second engagement feature 230, see FIGS. 7a and 7b. The top locking mechanism 150 is alterable into an unlocked state to allow the second cooking plate 210 to be detached from the housing 110 by actuation of the top button 151.

Figure 7A:
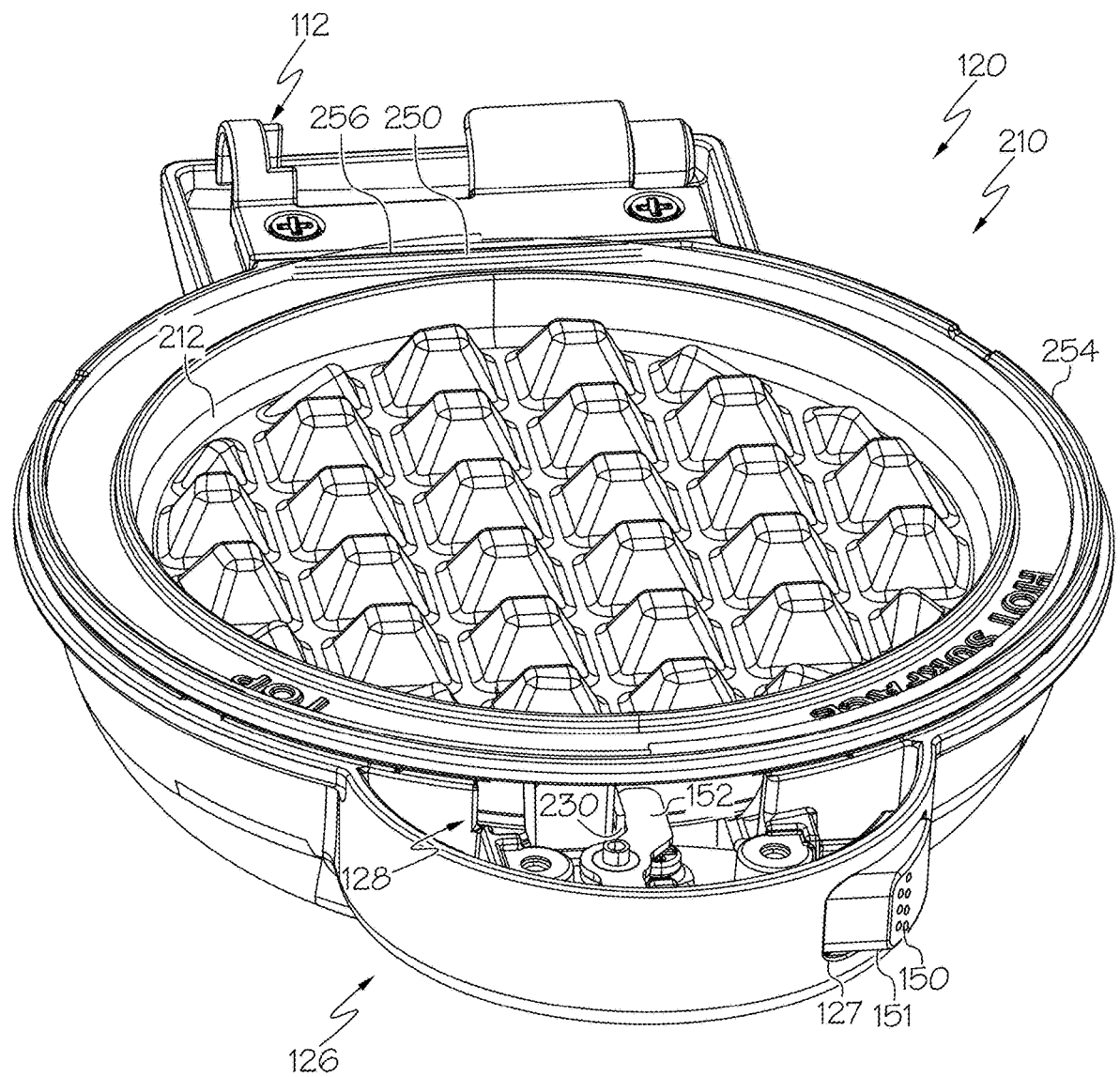
FIG. 7A is a top perspective view of a portion of the cooking appliance of FIG. 1.
Figure 7B:
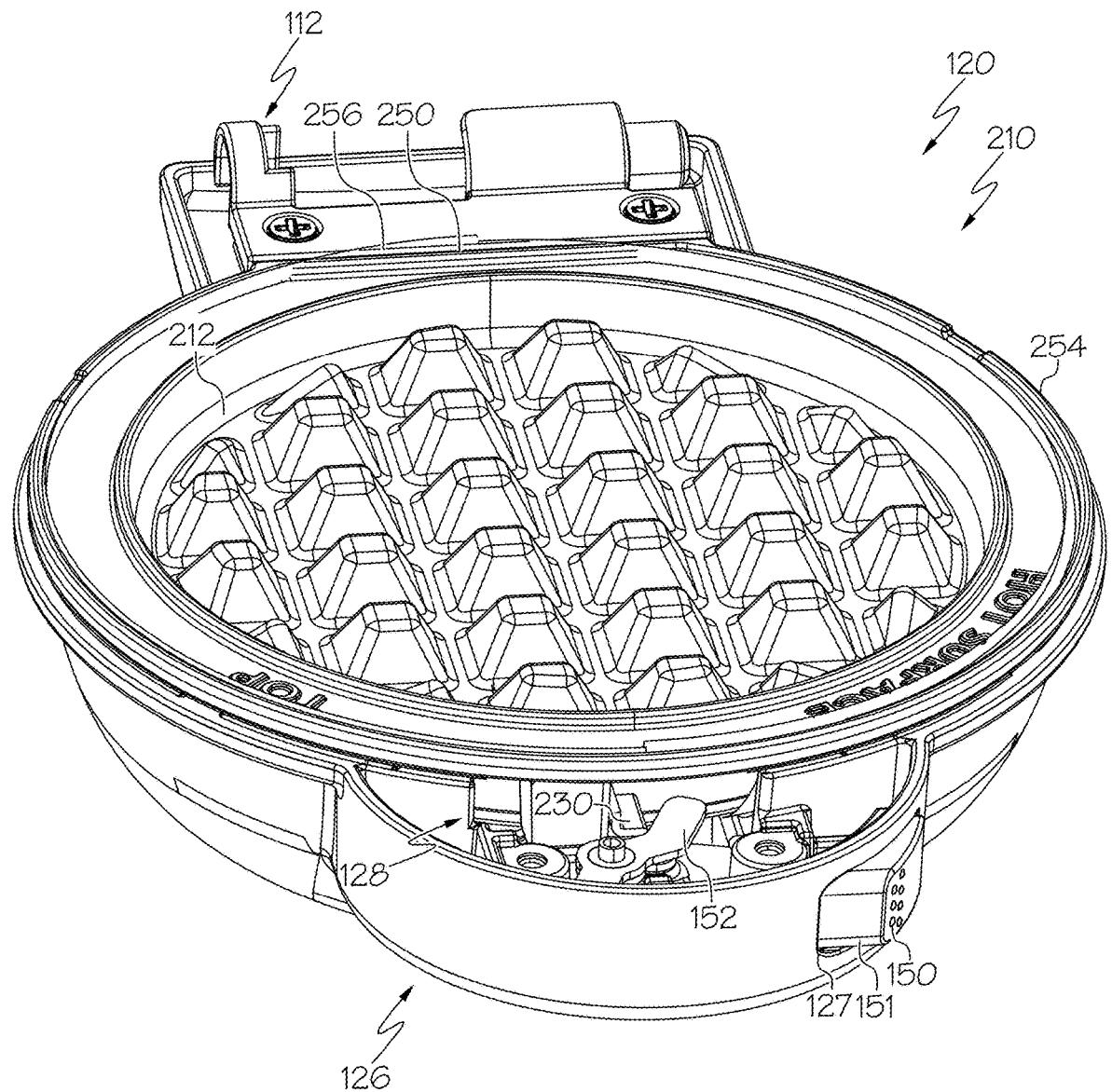
FIG. 7B is a top perspective view of a portion of the cooking appliance of FIG. 1.

In one example, the top locking mechanism 150 includes a top button 151 and a top latch 152 mechanically engaged with the top button 151, the top latch 152 being movable between a locked state and an unlocked state by actuation of the top button 151, see FIGS. 7a and 7b.

Referring to FIGS. 7a and 7b, in one or more examples, the top latch 152 is configured to be biased into the locked state. Inserting the second cooking plate 210 into the top portion 120 of the housing 110 causes the top latch 152 to alter from the locked state towards the unlocked state to fully seat the second cooking plate 210 within the open top end 124 of the top cavity 122, upon which the top latch 152 automatically biases back to the locked state to lock the second cooking plate 210 to the top portion 120 of the housing 110.

Still referring to FIGS. 7a and 7b and to FIG. 9, the second engagement feature 230 of the second cooking plate 210 includes a planar locking 232 surface and an angled engagement surface 234. During insertion of the second cooking plate 210 into the top portion 120 of the housing, the angled engagement surface 234 of the second engagement feature 230 engages the top latch 152 and moves the top latch 152 from the locked state towards the unlocked state. Further, upon the top latch 152 passing by the angled engagement surface 234, the top latch 152 biases back into the locked state whereby the top latch 152 engages the planar locking surface 232 of the second engagement feature 230.

Referring to FIG. 3, the second cooking plate 210 includes a peripheral edge 250 defining a planar portion 256 having at least one engagement tab 252 and an arcuate portion 254. The top portion 120 of the housing 110 defines at least one notch 190 configured to receive the at least one engagement tab 252 upon insertion of the second cooking plate 210 into the top portion 120 of the housing 110.

In one example, the first cooking plate 220 has a cooking surface, the second cooking plate 210 has a cooking surface, and the cooking surface of the first cooking plate 220 is different than the cooking surface of the second cooking plate 210.

In one or more examples, a cooking appliance 100 includes a housing 110 including a base portion 130 defining a base cavity 132 and an open top end 134 of the base cavity 132. The housing 110 further includes a top portion 120 alterable relative to the base portion 130 between an open state and a closed state.

The top portion 120 defines a top cavity 122 and an open top end 124 of the top cavity 122. The housing 110 further includes a base locking mechanism 140 coupled to the base portion 130 of the housing 110. In one or more examples, the housing 110 includes a top locking mechanism 150 coupled to the top portion 120 of the housing 110.

The cooking appliance 100 further includes a first heating element 160 located within the base cavity 132 of the base portion 130 of the housing 110 and a second heating element 170 located within the top cavity 122 of the top portion 120 of the housing 110.

In one or more examples, the cooking appliance 100 includes a first cooking plate 220 removably coupled to the base portion 130 of the housing 110 to close the open top end 134 of the base cavity 132. The first cooking plate 220 includes a first engagement feature 240. The cooking appliance 100 further includes a second cooking plate 210 removably coupled to the top portion 120 of the housing 110 to close the open top end 124 of the top cavity 122. The second cooking plate 210 includes a second engagement feature 230.

The first cooking plate 220 is configured to be locked to the housing 110 via engagement between the base locking mechanism 140 of the base portion 130 and the first engagement feature 240. The base locking mechanism 140 is alterable into an unlocked state to allow the first cooking plate 220 to be detached from the housing 110.

The second cooking plate 210 is configured to be locked to the housing 110 via engagement between the top locking mechanism 150 of the top portion 120 and the second engagement feature 230. The top locking mechanism 150 is alterable into an unlocked state to allow the second cooking plate 210 to be detached from the housing 110. For example, the top locking mechanism 150 is alterable upon actuation of the top button 151.

In one example, the first cooking plate 220 includes a peripheral edge 260 defining a planar portion 266 having two engagement tabs 262 and an arcuate portion 264. The base portion 130 of the housing 110 defines two notches 180 configured to receive two engagement tabs 262 upon insertion of the first cooking plate 220 into the base portion 130 of the housing 110.

In one or more examples, the second cooking plate 210 includes a peripheral edge 250 defining a planar portion 256 having two engagement tabs 252 and an arcuate portion 254. Further, the top portion 120 of the housing 110 defines two notches 190 configured to receive the two engagement tabs 252 upon insertion of the second cooking plate 210 into the top portion 120 of the housing 110. The engagement tabs 252 may be integral with the second cooking plate 210 such that they form a single, monolithic structure.

In one example, the base portion 130 defines an arcuate protrusion 136 defining an opening 137 and an internal cavity 138 housing at least a portion of the base locking mechanism 140. Further, the top portion 120 defines an arcuate protrusion 126 defining an opening 127 and an internal cavity 128 housing 110 at least a portion of the top locking mechanism 150.

In one example, the base locking mechanism 140 includes a base button 141 that extends through the opening 137 of the arcuate protrusion 136 of the base portion 130. The base locking mechanism 140 further includes a base latch 142 mechanically engaged with the base button 141, the base latch 142 being movable between a locked state and an unlocked state by actuation of the base button 141. In one example, the base latch 142 is mechanically engaged with the base button 141 with a spring, such as a torsion spring.

In one or more examples, the top locking mechanism 150 includes a top button 151 that extends through the opening 127 of the arcuate protrusion 126 of the top portion 120. The top locking mechanism, 150 further includes a top latch 152 mechanically engaged with the top button 151, the top latch 152 being movable between a locked state and an unlocked state by actuation of the top button 151. In one example, the top latch 152 is mechanically engaged with the top button 151 with a spring, such as a torsion spring.

In one example, the first cooking plate 220 includes a cooking surface 222 and a non-cooking surface 224 opposed from the cooking surface 222. The second cooking plate 210 includes a cooking surface 212 and a non-cooking surface 214 opposed from the cooking surface 212. In one example, the cooking surface 222 of the first cooking plate 220 is different than the cooking surface 212 of the second cooking plate 210. For instance, the cooking surface 222 of the first cooking plate 220 may include a pattern or design that is different from the patter or design of the cooking surface 212 of the second cooking plate 210.

While the disclosure has been described with respect to specific examples including presently preferred modes of carrying out the disclosure, those skilled in the art will appreciate that there are numerous variations and permutations of the above-described systems and techniques. It is to be understood that other embodiments may be utilized and structural and functional modifications may be made without departing from the scope of the present disclosure. Thus, the spirit and scope of the disclosure should be construed broadly as set forth in the appended claims.

What is claimed is:

1. A cooking appliance comprising:
   a housing comprising:
   a base portion defining a base cavity and an open top end of the base cavity;
   a top portion alterable relative to the base portion between an open state and a closed state; and
   a base locking mechanism coupled to the base portion of the housing;
   a first cooking plate removably coupled to the base portion of the housing to close the open top end of the base cavity, the cooking plate defining a first engagement feature;
   wherein the first cooking plate is configured to be locked to the housing via engagement between the base locking mechanism of the base portion and the first engagement feature; and
   wherein the base locking mechanism is alterable into an unlocked state to allow the first cooking plate to be detached from the housing; and
   wherein the base locking mechanism comprises:
   a base button;
   a push rod operatively associated with the base button;
   a spring coupled to the push rod;
   a latch rotatably coupled to the push rod;
   a fixed sheet coupled to the base portion of the housing, wherein the latch is rotatably coupled to the fixed sheet;
   wherein the base button is movably positioned in the housing;
   wherein the spring is configured to provide an elastic force on the base button and the push rod to move between a first position at a first distance between a rotation point at which the base latch is rotatably connected to the fixed sheet and a first end of the base latch, the first distance being smaller than a second distance between the rotation point and a second end of the base latch, and wherein when the base button is moved from the initial position by an external force to drive the base latch to rotate through the push rod, the second end of the base latch moves from a connected position at which the second end of the base latch is buckled to a non-connected position at which the second end of the base latch is not buckled.

2. The cooking appliance of claim 1, wherein the latch and the fixed sheet are rotatably connected by a first rotation connecting member, and wherein the second end of the push rod and the first end of the base latch are rotatably connected by a second rotation connecting member.

3. The cooking appliance of claim 1, wherein the fixed sheet is coupled to the housing by at least one screw.

4. The cooking appliance of claim 1, wherein the spring is wrapped around the push rod, wherein a first end of the spring abuts the housing, and wherein a second end of the spring abuts the base button.

5. The cooking appliance of claim 1, wherein when the base latch passes by the angled engagement surface, the base latch biases back into the locked state, whereby the base latch engages the planar locking surface of the first engagement feature, and wherein and the spring provides an elastic force for driving the second end of the base latch to move toward the planar locking surface to enable the second end of the base latch to move to the connected position, abutting a locking groove defined by the planar locking surface.

6. The cooking appliance of claim 1, further comprising an oblique guiding mechanism for coupling the first cooking plate with the base portion, wherein when the when the first cooking plate is installed to the base portion, the angled engagement surface of the first engagement feature engages the base latch, and wherein the oblique guiding mechanism is configured to enable the first cooking plate to approach the base portion and to rotate synchronously so that the guiding slope rotates in a direction of pushing the second end of the base latch to rotate, wherein the oblique guiding mechanism comprises a guiding post and an oblique guiding groove, wherein the guiding post is disposed on the first cooking plate, wherein the oblique guiding groove is formed on the base portion, and wherein when the first cooking plate is pressed against the base portion, the guiding post abuts the oblique guiding groove to make the first cooking plate rotate relative to the housing.

7. A cooking appliance comprising:
a base portion comprising:
a base main body section comprising a base cavity having an open top end;
a base protrusion extending from the base main body section and comprising a first internal cavity; and
a first pair of notches;
a top portion hingedly coupled to the base portion so as to be alterable between an open state and a closed state, the top portion comprising:
a top main body section comprising a top cavity having an open top end;
a top protrusion extending from the top main body section and comprising a second internal cavity; and
a second pair of notches;
a base latch mounted to the base protrusion of the base portion, the base latch and the first pair of notches located on opposite sides of the base cavity;
a top latch mounted to the top protrusion of the top portion, the top latch and the second pair of notches located on opposite sides of the top cavity;
a first heating element located within the base cavity;
a second heating element located within the top cavity;
a first cooking plate removably coupled to the base portion to close the open top end of the base cavity, the first cooking plate comprising:
a first peripheral edge; and
a first pair of tabs protruding from a rear portion of the first peripheral edge of the first cooking plate, the first pair of tabs received within the first pair of notches;

a second cooking plate removably coupled to the top portion of the housing to close the open top end of the top cavity, the second cooking plate comprising:
a second peripheral edge; and
a second pair of tabs protruding from a rear portion of the second peripheral edge of the second cooking plate, the second pair of tabs received within the second pair of notches;
the base latch alterable between: (1) a locked state in which the first cooking plate is locked to the base portion through engagement of the base latch and a front portion of the first cooking plate; and (2) an unlocked state that allows the first cooking plate to be removed from the base portion;
a first spring located within the first internal cavity of the base protrusion and biasing the base latch into the locked state;
the top latch alterable between: (1) a locked state in which the second cooking plate is locked to the top portion through engagement of the top latch and a front portion of the second cooking plate; and (2) an unlocked state that allows the second cooking plate to be removed from the top portion; and
a second spring located within the second internal cavity of the top protrusion and biasing the top latch into the locked state.

8. The cooking appliance of claim 7, further comprising:
the first cooking plate comprising:
a first planar locking surface located at the front portion of the first cooking plate; and
a first angled engagement surface located at the front portion of the first cooking plate;
the second cooking plate comprising:
a second planar locking surface located at the front portion of the second cooking plate; and
a second angled engagement surface located at the front portion of the second cooking plate;
wherein when the base latch is in the locked state, the first cooking plate is locked to the base portion through engagement of the base latch and the first planar locking surface; and
wherein when the top latch is in the locked state, the second cooking plate is locked to the top portion through engagement of the top latch and the second planar locking surface.

9. The cooking appliance according to claim 8, further comprising:
wherein during coupling of the first cooking plate to the base portion, the first angled engagement surface of the first cooking plate engages and moves the base latch from the locked state to the unlocked state; and
wherein during coupling of the second cooking plate into the top portion, the second angled engagement surface engages and moves the top latch from the locked state to the unlocked state.

10. The cooking appliance according to claim 7, further comprising:
a first user-operated actuator located on the base protrusion and positioned in a first opening of the base protrusion, the first user-operated actuator mechanically engaged with the base latch to alter the base latch between the locked state and the unlocked state by actuation of the first user-operated actuator; and
a second user-operated actuator located on the top protrusion and positioned in a second opening of the top protrusion, the second user-operated actuator mechanically engaged with the top latch to alter the top latch between the locked state and the unlocked state by actuation of the second user-operated actuator.

11. The cooking appliance according to claim 10, further comprising:
   wherein the base latch and the first user-operated actuator are separate components; and
   wherein the top latch and the second user-operated actuator are separate components.

12. The cooking appliance according to claim 7, further comprising:
   wherein the base main body section is bowl-shaped and comprises an inner wall surface defining the base cavity and an outer wall surface, the base protrusion protruding from a front upper portion of the outer wall surface of the base main body;
   wherein the top main body section is upside-down bowl-shaped and comprises an inner wall surface defining the top cavity and an outer wall surface, the top protrusion protruding from a front lower portion of the outer wall surface of the top main body.

13. The cooking appliance according to claim 12, further comprising:
   the base portion comprising a base rear section extending from a rear of the outer wall surface of the base main body section;
   the top portion comprising a top rear section extending from a rear of the outer wall surface of the top main body section; and
   a hinge operably coupled to the base rear section and the top rear section to hingedly couple the base portion to the top portion.

14. The cooking appliance according to claim 7, further comprising:
   a first cylindrical post protruding from a floor of the base cavity; and
   a second cylindrical post protruding from a floor of the top cavity.

15. The cooking appliance according to claim 7, further comprising:
   a first wall separating the base cavity from the first internal cavity, the base latch extending through a notch in the first wall to engage the front portion of the first cooking plate in the locked state; and
   a second wall separating the top cavity from the second internal cavity, the top latch extending through a notch in the second wall to engage the front portion of the second cooking plate in the locked state.

16. The cooking appliance of claim 7, further comprising:
   the first cooking plate comprising:
      a first planar locking surface located at the front portion of the first cooking plate; and
      a first angled engagement surface located at the front portion of the first cooking plate;
   the second cooking plate comprising:
      a second planar locking surface located at the front portion of the second cooking plate; and
      a second angled engagement surface located at the front portion of the second cooking plate;
   wherein when the base latch is in the locked state, the first cooking plate is locked to the base portion through engagement of the base latch and the first planar locking surface;
   wherein when the top latch is in the locked state, the second cooking plate is locked to the top portion through engagement of the top latch and the second planar locking surface;
   wherein during coupling of the first cooking plate to the base portion, the first angled engagement surface of the first cooking plate engages and moves the base latch from the locked state to the unlocked state;
   wherein during coupling of the second cooking plate into the top portion, the second angled engagement surface engages and moves the top latch from the locked state to the unlocked state;
   a first user-operated actuator located on the base protrusion and positioned in a first opening of the base protrusion, the first user-operated actuator mechanically engaged with the base latch to alter the base latch between the locked state and the unlocked state by actuation of the first user-operated actuator;
   a second user-operated actuator located on the top protrusion and positioned in a second opening of the top protrusion, the second user-operated actuator mechanically engaged with the top latch to alter the top latch between the locked state and the unlocked state by actuation of the second user-operated actuator;
   wherein the base main body section is bowl-shaped and comprises an inner wall surface defining the base cavity and an outer wall surface, the base protrusion protruding from a front upper portion of the outer wall surface of the base main body;
   wherein the top main body section is upside-down bowl-shaped and comprises an inner wall surface defining the top cavity and an outer wall surface, the top protrusion protruding from a front lower portion of the outer wall surface of the top main body;
   the base portion comprising a base rear section extending from a rear of the base main body section;
   the top portion comprising a top rear section extending from a rear of the top main body section;
   a hinge operably coupled to the base rear section and the top rear section to hingedly couple the base and top portions to one another;
   a first cylindrical post protruding from a floor of the base cavity;
   a second cylindrical post protruding from a floor of the top cavity;
   a first wall separating the base cavity from the first internal cavity, the base latch extending through a notch in the first wall to engage the front portion of the first cooking plate in the locked state; and
   a second wall separating the top cavity from the second internal cavity, the top latch extending through a notch in the second wall to engage the front portion of the second cooking plate in the locked state.

17. The cooking appliance according to claim 16, wherein the first spring is a first coil spring that is compressed and shortened when the base latch is altered from the locked state to the unlocked state; and wherein the second spring is a second coil spring that is compressed and shortened when the top latch is altered from the locked state to the unlocked state.

18. The cooking appliance according to claim 7, wherein the first spring is a first coil spring that is compressed and shortened when the base latch is altered from the locked state to the unlocked state; and wherein the second spring is a second coil spring that is compressed and shortened when the top latch is altered from the locked state to the unlocked state.

19. A cooking appliance comprising:
a housing comprising:
- a base portion comprising:
  - a base main body section comprising a base cavity having an open top end;
  - a base protrusion extending from the base main body section; and
  - a first pair of notches, the first pair of notches and the base protrusion located on opposite sides of the base cavity;
- a top portion comprising:
  - a top main body section comprising a top cavity having an open top end;
  - a top protrusion extending from the top main body section; and
  - a second pair of notches, the second pair of notches and the top protrusion located on opposite sides of the top cavity;
a first heating element located within the base cavity;
a second heating element located within the top cavity;
a first cooking plate removably coupled to the base portion to close the open top end of the base cavity, the first cooking plate comprising:
- a first peripheral edge;
- a first pair of tabs protruding from a rear portion of the first peripheral edge of the first cooking plate, the first pair of tabs received within the first pair of notches; and
- a first engagement feature in the form of a notch, cutout, or recess formed along a front portion of the first peripheral edge;
a second cooking plate removably coupled to the top portion of the housing to close the open top end of the top cavity, the second cooking plate comprising:
- a second peripheral edge;
- a second pair of tabs protruding from a rear portion of the second peripheral edge of the second cooking plate, the second pair of tabs received within the second pair of notches; and
- a second engagement feature in the form of a notch, cutout, or recess formed along a front portion of the second peripheral edge;
a base latch mounted to the base protrusion of the base portion of the housing, the base latch alterable between: (1) a locked state in which the first cooking plate is locked to the base portion of the housing through engagement of the base latch and the first engagement feature; and (2) an unlocked state that allows the first cooking plate to be removed from the base portion;
a first spring located within an internal cavity of the base protrusion that biases the base latch into the locked state;
a top latch mounted to the top protrusion of the top portion of the housing, the top latch alterable between: (1) a locked state in which the top cooking plate is locked to the top portion of the housing through engagement of the top latch and the second engagement feature; and (2) an unlocked state that allows the second cooking plate to be removed from the top portion; and
a second spring located within an internal cavity of the top protrusion that biases the top latch into the locked state.

20. The cooking appliance according to claim 19, further comprising:
- a first user-operated actuator located on the base protrusion and positioned in a first opening of the base protrusion, the first user-operated actuator mechanically engaged with the base latch to alter the base latch between the locked state and the unlocked state;
- a second user-operated actuator located on the top protrusion and positioned in a second opening of the top protrusion, the second user-operated actuator mechanically engaged with the top latch between the locked state and the unlocked state;
- wherein the base main body section is bowl-shaped and comprises an inner wall surface defining the base cavity and an outer wall surface, the base protrusion protruding from a front upper portion of the outer wall surface of the base main body;
- wherein the top main body section is bowl-shaped and comprises an inner wall surface defining the top cavity and an outer wall surface, the top protrusion protruding from a front upper portion of the outer wall surface of the top main body;
- the base portion comprising a base rear section extending from a rear of the base main body section;
- the top portion comprising a top rear section extending from a rear of the top main body section;
- a hinge operably coupled to the base rear section and the top rear section to hingedly couple the base and top sections to one another;
- a first cylindrical post protruding from a floor of the base cavity;
- a second cylindrical post protruding from a floor of the top cavity;
- a first wall separating the base cavity from the first internal cavity, the base latch extending through a notch in the first wall to engage the front portion of the first cooking plate in the locked state; and
- a second wall separating the top cavity from the second internal cavity, the top latch extending through a notch in the second wall to engage the front portion of the second cooking plate in the locked state.

21. The cooking appliance according to claim 20, wherein the first spring is a first coil spring that is compressed and shortened when the base latch is altered from the locked state to the unlocked state; and wherein the second spring is a second coil spring that is compressed and shortened when the top latch is altered from the locked state to the unlocked state.

22. The cooking appliance according to claim 19, wherein the first spring is a first coil spring that is compressed and shortened when the base latch is altered from the locked state to the unlocked state; and wherein the second spring is a second coil spring that is compressed and shortened when the top latch is altered from the locked state to the unlocked state.

* * * * *